(12) United States Patent
Chrysanthakopoulos

(10) Patent No.: US 8,621,471 B2
(45) Date of Patent: Dec. 31, 2013

(54) HIGH ACCURACY TIMER IN A MULTI-PROCESSOR COMPUTING SYSTEM WITHOUT USING DEDICATED HARDWARE TIMER RESOURCES

(75) Inventor: Georgios Chrysanthakopoulos, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1185 days.

(21) Appl. No.: 12/190,606

(22) Filed: Aug. 13, 2008

(65) Prior Publication Data

US 2010/0043000 A1 Feb. 18, 2010

(51) Int. Cl.
*G06F 9/46* (2006.01)

(52) U.S. Cl.
USPC .......................................................... 718/102

(58) Field of Classification Search
None
See application file for complete search history.

(56) References Cited

U.S. PATENT DOCUMENTS

| | | | |
|---|---|---|---|
| 4,445,197 A | | 4/1984 | Lorie et al. |
| 6,038,545 A | * | 3/2000 | Mandeberg et al. ............ 705/15 |
| 6,219,728 B1 | | 4/2001 | Yin |
| 6,434,590 B1 | | 8/2002 | Blelloch et al. |
| 6,820,263 B1 | | 11/2004 | Klappholz |
| 8,000,946 B2 | * | 8/2011 | Haas et al. ........................ 703/6 |
| 2005/0223382 A1 | | 10/2005 | Lippett |
| 2006/0149526 A1 | * | 7/2006 | Torossian et al. ................ 703/16 |
| 2006/0265712 A1 | * | 11/2006 | Zhou et al. ..................... 718/102 |
| 2008/0104604 A1 | | 5/2008 | Li et al. |
| 2008/0120619 A1 | | 5/2008 | Podila |

OTHER PUBLICATIONS

Jovanovi'C et al, "Task Scheduling in Distributed Systems by Work Stealing and Mugging—A Simulation Study","Journal of Computing and Information Technology", 2002, pp. 259-264.
"Deploy Embedded Code onto Ti's C2000TM Processors" "Target Support Package", The Mathworks, pp. 4.
"Parallel Sysplex", "IBM Server Time Protocol", IBM, p. 2.

* cited by examiner

*Primary Examiner* — Meng An
*Assistant Examiner* — James J Lee
(74) *Attorney, Agent, or Firm* — L. Alan Collins; Collins & Collins Intellectual, LLC

(57) ABSTRACT

Technologies for a high-accuracy timer in a tasked-based, multi-processor computing system without using dedicated hardware timer resources.

18 Claims, 3 Drawing Sheets

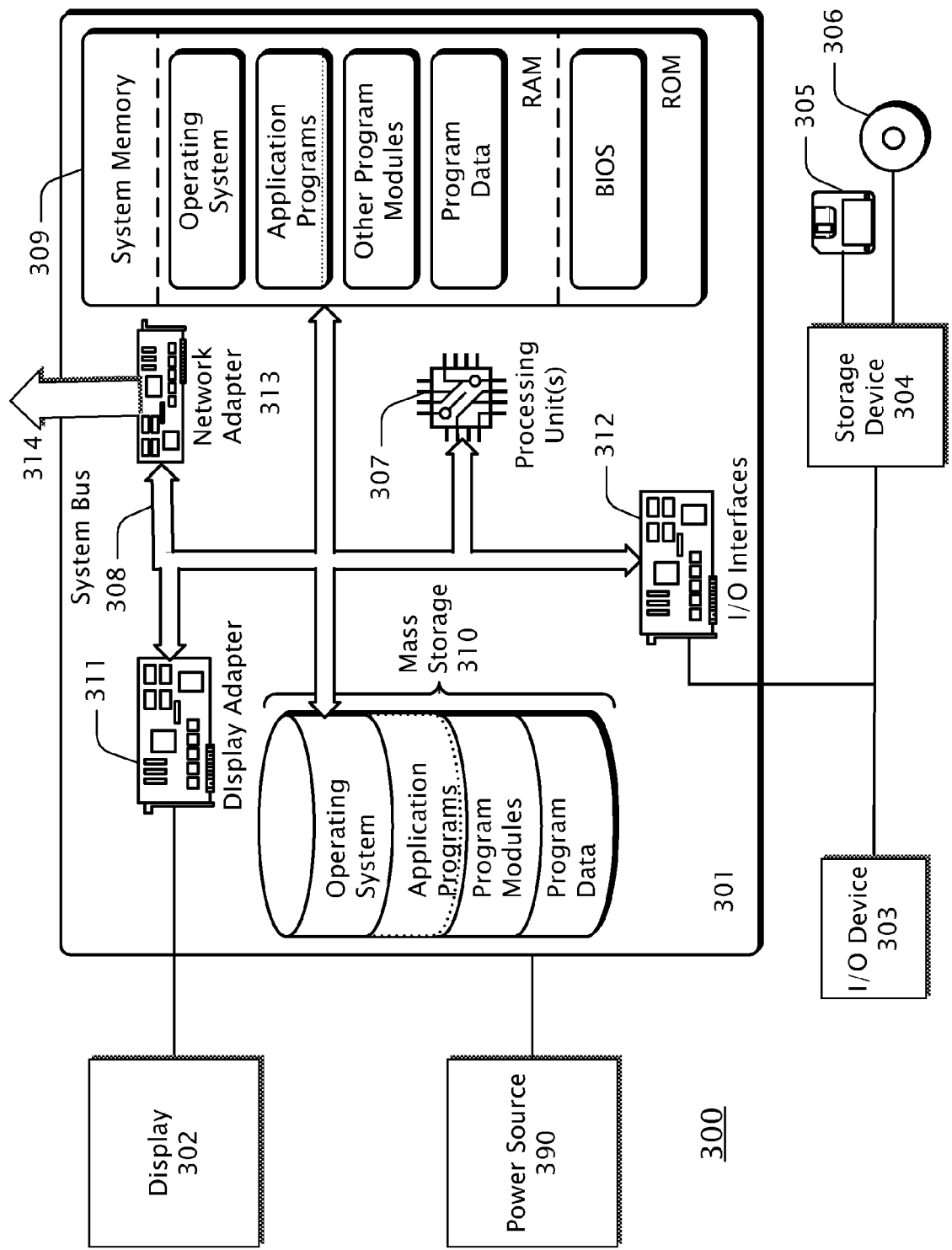

HIGH ACCURACY TIMER IN A MULTI-PROCESSOR COMPUTING SYSTEM WITHOUT USING DEDICATED HARDWARE TIMER RESOURCES

BACKGROUND

Current solutions for timers in general purpose computer operating systems ("OS") require either a dedicated OS resource in a privileged execution mode (kernel) to periodically wake up due to interrupts from a clock signal, or rely on user-level OS threads that perform timed waits on OS kernel synchronization objects or the like. In real time applications, where high accuracy timers (one time or periodic) are required there is a need for minimum jitter (e.g., the variance between timer events relative to their scheduled time). Current technologies, especially those that use user mode only resources like thread and kernel objects, result in very high jitter (typically over 15 milliseconds on a typical modern OS) and for any higher resolution either waste central processing unit ("CPU") resources or don't re-use scheduling logic to increase timer performance.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present examples provide technologies for a high-accuracy timer in a tasked-based, multi-processor computing system without using dedicated hardware timer resources.

Many of the attendant features will be more readily appreciated as the same become better understood by reference to the following detailed description considered in connection with the accompanying drawings.

DESCRIPTION OF THE DRAWINGS

The present description will be better understood from the following detailed description considered in connection with the accompanying drawings, wherein:

FIG. 3 is a block diagram showing an example computing environment in which the technologies described herein may be implemented.

Like reference numerals are used to designate like parts in the accompanying drawings.

DETAILED DESCRIPTION

The detailed description provided below in connection with the accompanying drawings is intended as a description of the present examples and is not intended to represent the only forms in which the present examples may be constructed or utilized. The description sets forth at least some of the functions of the examples and/or the sequence of steps for constructing and operating examples. However, the same or equivalent functions and sequences may be accomplished by different examples.

Although the present examples are described and illustrated herein as being implemented in a computing system, the system described is provided as an example and not a limitation. As those skilled in the art will appreciate, the present examples are suitable for application in a variety of different types of computing systems.

Figure 1:
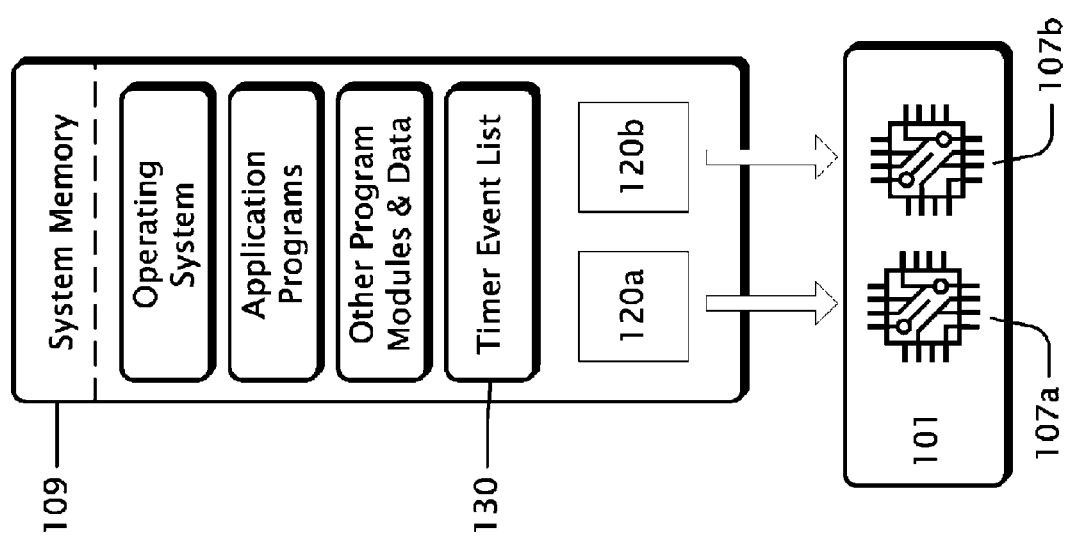
FIG. 1 is a block diagram showing portions of an example multi-core high-accuracy timer system.

FIG. 1 is a block diagram showing portions of an example multi-core high-accuracy timer system. Example computing system or device 101 is typically similar to computing device 301 of FIG. 3 and generally includes a plurality of processors or cores, such as example processors 107a and 107b, typically similar to example processor(s) 307 of FIG. 3. Computing device 101 typically includes system memory 109 which, in this example, includes an operating system, various applications programs, other program modules and data, and timer event list ("TEL") 130. Further, Example computing device 101 includes task schedulers 120a and 120b, each associated with a corresponding processor. In other examples, the number of processors may be greater than two. Two example processors are shown in FIG. 1 as an example and not a limitation. In general, the larger the number of processors, the greater the accuracy of the timer system.

TEL 130 is typically a data structure that includes a list of timer events scheduled by client software. Client software may include the operating system and/or operating system components or the like, applications programs or the like, device drivers or the like, or any other computer-executable instructions that may make used of the high-accuracy system timer. TAL 130 generally includes a record or the like for each scheduled timer event, each record including a trigger time for the timer event and a call-back address or port or the like identifying specific computer-executable instructions to be executed when the scheduled event time is reached. TEL 130 is generally maintained in sorted order with the scheduled timer event with the closest trigger time first. The trigger time is typically the time at which a scheduled event it to take place, that is when the call-back associated with the scheduled timer event is to be executed. A scheduled timer event is typically a timer event that has been placed on TEL 130. The representation for the trigger time may be in any suitable format including, but not limited to, an absolute time value, a relative time value, a tick count or the like, etc. The exact format and/or structure of TEL 130 and the scheduled timer event records contained therein is not generally critical to the present invention beyond that specified herein.

Timer events may be one-time or periodic. For example, a one-time event is scheduled to take place at one specific time. At or about that time a call-back routine is executed after which the timer event is complete. A periodic timer event, on the other hand is generally scheduled to recur on some specific interval, such as once every 10 milliseconds, for example. In this example, at or about each 10 millisecond interval the call-back is executed yet again. Other types of timer events may similarly be supported.

In this example, system memory 109 typically includes one or more task schedulers such as example task schedulers 120a and 120b. These task schedulers are similar to conventional operating system task schedulers except that they have been modified to perform specific aspects of the present invention as described in connection with FIG. 2 herein below. In general, an operating system instantiates a task schedule for each processor in computing device 101, such as example task scheduler 120a associated with example processor 107a and example task scheduler 120b associated with example processor 107b.

As in a conventional computing device, the operating system in this example typically breaks up applications, programs, and other executable code or the like into tasks, small portions of executable code that generally take a small amount of time to be executed, such small amounts of time typically being measured in up to hundreds of microseconds. Such tasks are generally queued up by the operating system for execution as soon as a processor becomes available. Each task generally represents a discreet, self-contained unit of work to be performed by a processor. Each task scheduler typically takes a task from one or more task queues of the operating system and assigns the task to a corresponding processor for execution. Once a task scheduler has taken ownership of a task it is typically no longer available for any other task scheduler to take. Upon completion of the task, a conventional task schedule typically takes ownership of a next task from the task queue. Example task schedulers 120a and 120b operate as described in the foregoing, but are modified to further behave in a non-conventional manner as described in connection with FIG. 2 herein below.

Task schedulers of the present invention are typically implemented using computer-executable instructions that are executed by a computing device such as example computing device 101 and/or 301 of FIG. 3. In alternate embodiments they may be implemented in hardware, firmware, software, and any combination of the like.

Figure 2:
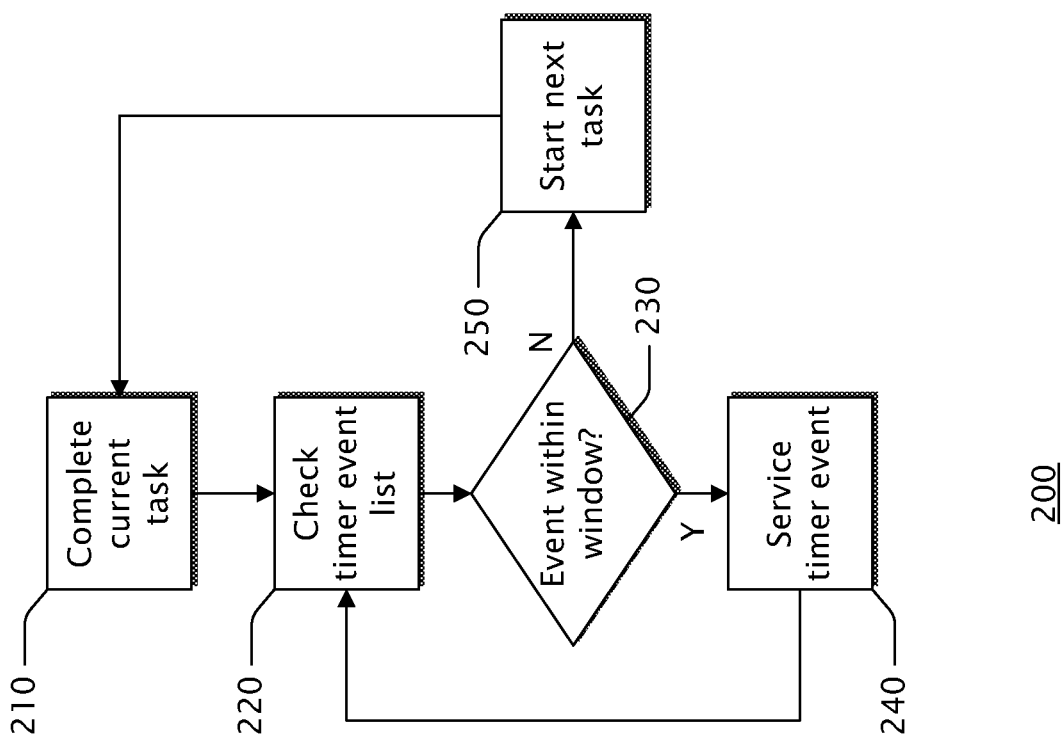
FIG. 2 is a block diagram showing an example multi-core high-accuracy timer method.

FIG. 2 is a block diagram showing an example multi-core high-accuracy timer method 200. Method 200 is typically performed each of a plurality of non-conventional task schedulers, each associated with a processor.

Block 210 typically indicates a processor completing a task. Once the task is completed, method 200 typically continues at block 220.

Block 220 typically indicates the task scheduler checking a timer event list, such as TEL 130 of FIG. 1, for a next scheduled timer event. If there is a next scheduled timer event in the time event list, then method 200 typically continues at block 230. Otherwise (not shown in FIG. 2) method 200 typically continues at block 250. Note that a conventional task scheduler would not check or even be aware of a timer event list, but simply check one or more task queues for a next task to process.

Block 230 typically indicates the task scheduler determining if the next scheduled timer event is scheduled to trigger within a window of time, such as within the next several microseconds. If the next scheduled timer event is scheduled to trigger within the window of time, the method 200 typically continues at block 250. Otherwise method 200 typically continues at block 250.

Block 240 typically indicates the task scheduler servicing the next scheduled timer event. Servicing a scheduled timer event typically includes taking ownership of the next scheduled timer event such that no other task scheduler will attempt to service it, and further includes having the associated processor execute the computer-executable instruction at the call-back address or the like of the next schedule timer event. Once the next scheduled timer event has been processed (executed) then method 200 typically continues at block 220.

Block 250 typically indicates the task scheduler check one or more task queues for a next task to process. Once the next task is processed then method 200 typically continues at block 210.

Typically method 200 is performed by a plurality of task schedulers simultaneously, such as example task schedulers 120a and 120b of FIG. 1. Task scheduler/processor combinations may be viewed as competing for tasks to perform from one or more task queues. As tasks are completed, conventional task schedulers tend to compete for the next task to perform. In the present invention, non-conventional task schedulers complete tasks and then compete for timer events to service (per block 220) prior to competing for next tasks to process. This competition tends to improve responsiveness to scheduled timer events thus improving the accuracy of the timer system. The greater the number of task schedulers of the present invention tends to result in greater accuracy and less jitter of scheduled timer event handling. In one example implementation of the present invention, accuracies of better than 1 millisecond have been demonstrated.

FIG. 3 is a block diagram showing an example computing environment 300 in which the technologies described herein may be implemented. A suitable computing environment may be implemented with numerous general purpose or special purpose systems. Examples of well known systems may include, but are not limited to, cell phones, personal digital assistants ("PDA"), personal computers ("PC"), hand-held or laptop devices, microprocessor-based systems, multiprocessor systems, servers, workstations, consumer electronic devices, set-top boxes, and the like.

Computing environment 300 typically includes a general-purpose computing system in the form of a computing device 301 coupled to various components, such as peripheral devices 302, 303, 304 and the like. System 300 may couple to various other components, such as input devices 303, including voice recognition, touch pads, buttons, keyboards and/or pointing devices, such as a mouse or trackball, via one or more input/output ("I/O") interfaces 312. The components of computing device 301 may include one or more processors (including central processing units ("CPU"), graphics processing units ("GPU"), microprocessors ("µP"), cores, and the like) 307, system memory 309, and a system bus 308 that typically couples the various components. Processor 307 typically processes or executes various computer-executable instructions to control the operation of computing device 301 and to communicate with other electronic and/or computing devices, systems or environment (not shown) via various communications connections such as a network connection 314 or the like. System bus 308 represents any number of several types of bus structures, including a memory bus or memory controller, a peripheral bus, a serial bus, an accelerated graphics port, a processor or local bus using any of a variety of bus architectures, and the like.

System memory 309 may include computer readable media in the form of volatile memory, such as random access memory ("RAM"), and/or non-volatile memory, such as read only memory ("ROM") or flash memory ("FLASH"). A basic input/output system ("BIOS") may be stored in non-volatile or the like. System memory 309 typically stores data, computer-executable instructions and/or program modules comprising computer-executable instructions that are immediately accessible to and/or presently operated on by one or more of the processors 307.

Mass storage devices 304 and 310 may be coupled to computing device 301 or incorporated into computing device 301 via coupling to the system bus. Such mass storage devices 304 and 310 may include non-volatile RAM, a magnetic disk drive which reads from and/or writes to a removable, non-volatile magnetic disk (e.g., a "floppy disk") 305, and/or an optical disk drive that reads from and/or writes to a non-volatile optical disk such as a CD ROM, DVD ROM 306. Alternatively, a mass storage device, such as hard disk 310, may include non-removable storage medium. Other mass storage devices may include memory cards, memory sticks, tape storage devices, and the like.

Any number of computer programs, files, data structures, and the like may be stored in mass storage 310, other storage devices 304, 305, 306 and system memory 309 (typically limited by available space) including, by way of example and not limitation, operating systems, application programs, data files, directory structures, computer-executable instructions, and the like.

Output components or devices, such as display device 302, may be coupled to computing device 301, typically via an interface such as a display adapter 311. Output device 302 may be a liquid crystal display ("LCD"). Other example output devices may include printers, audio outputs, voice outputs, cathode ray tube ("CRT") displays, tactile devices or other sensory output mechanisms, or the like. Output devices may enable computing device 301 to interact with human operators or other machines, systems, computing environments, or the like. A user may interface with computing environment 300 via any number of different I/O devices 303 such as a touch pad, buttons, keyboard, mouse, joystick, game pad, data port, and the like. These and other I/O devices may be coupled to processor 307 via I/O interfaces 312 which may be coupled to system bus 308, and/or may be coupled by other interfaces and bus structures, such as a parallel port, game port, universal serial bus ("USB"), fire wire, infrared ("IR") port, and the like.

Computing device 301 may operate in a networked environment via communications connections to one or more remote computing devices through one or more cellular networks, wireless networks, local area networks ("LAN"), wide area networks ("WAN"), storage area networks ("SAN"), the Internet, radio links, optical links and the like. Computing device 301 may be coupled to a network via network adapter 313 or the like, or, alternatively, via a modem, digital subscriber line ("DSL") link, integrated services digital network ("ISDN") link, Internet link, wireless link, or the like.

Communications connection 314, such as a network connection, typically provides a coupling to communications media, such as a network. Communications media typically provide computer-readable and computer-executable instructions, data structures, files, program modules and other data using a modulated data signal, such as a carrier wave or other transport mechanism. The term "modulated data signal" typically means a signal that has one or more of its characteristics set or changed in such a manner as to encode information in the signal. By way of example, and not limitation, communications media may include wired media, such as a wired network or direct-wired connection or the like, and wireless media, such as acoustic, radio frequency, infrared, or other wireless communications mechanisms.

Power source 390, such as a battery or a power supply, typically provides power for portions or all of computing environment 300. In the case of the computing environment 300 being a mobile device or portable device or the like, power source 390 may be a battery. Alternatively, in the case computing environment 300 is a desktop computer or server or the like, power source 390 may be a power supply designed to connect to an alternating current ("AC") source, such as via a wall outlet.

Some mobile devices may not include many of the components described in connection with FIG. 3. For example, an electronic badge may be comprised of a coil of wire along with a simple processing unit 307 or the like, the coil configured to act as power source 390 when in proximity to a card reader device or the like. Such a coil may also be configure to act as an antenna coupled to the processing unit 307 or the like, the coil antenna capable of providing a form of communication between the electronic badge and the card reader device. Such communication may not involve networking, but may alternatively be general or special purpose communications via telemetry, point-to-point, RF, IR, audio, or other means. An electronic card may not include display 302, I/O device 303, or many of the other components described in connection with FIG. 3. Other mobile devices that may not include many of the components described in connection with FIG. 3, by way of example and not limitation, include electronic bracelets, electronic tags, implantable devices, and the like.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" typically refers to executable instructions, code, data, applications, programs, or the like maintained in an electronic device such as a ROM. The term "software" generally refers to executable instructions, code, data, applications, programs, or the like maintained in or on any form of computer-readable media. The term "computer-readable media" typically refers to system memory, storage devices and their associated media, and the like.

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

The invention claimed is:

1. A computing system configured for performing actions, the system comprising a plurality of processors and a plurality of task schedulers that each corresponds to a unique one of the plurality of processors, the actions comprising:
    completing a current task;
    checking a timer event list for a scheduled timer event;
    determining if the scheduled timer event is scheduled to trigger within a particular window of time; and
    if the scheduled timer event is scheduled to trigger within the particular window of time then servicing the scheduled timer event, otherwise checking for a next task, where each of the plurality of task schedulers is configured for competing with others of the plurality of task schedulers to service timer events on the timer event list prior to competing to process tasks, and is further configured for checking, upon completion of a task by the unique one of the plurality of processors that corresponds to the each of the plurality of schedulers, for a scheduled timer event on the timer event list, where timer events are maintained on the timer event list in a sorted order based on trigger times, and where one of the maintained timer events with a closest of the trigger times is first on the timer event list.

2. The computing system of claim 1 wherein client software schedules a timer event on the timer event list.

3. The computing system of claim 1 wherein the scheduled timer event comprises a trigger time and a call-back address.

4. The computing system of claim 1, the actions further comprising:
removing the scheduled timer event from the timer event list; and
executing the scheduled timer event.

5. The computing system of claim 1 wherein the scheduled timer event is a one-time event.

6. The computing system of claim 1 wherein the scheduled timer event is a periodic timer event.

7. The computing system of claim 1 wherein each of the plurality of task schedulers compete to service the scheduled timer event.

8. The computing system of claim 1 wherein a task scheduler services the scheduled timer event if the scheduled timer event is scheduled to trigger within a particular window of time.

9. A method of servicing timer events, the method performed by a plurality of processors and a plurality of task schedulers that each corresponds to a unique one of the plurality of processors, the method comprising:
completing a current task;
checking a timer event list for a scheduled timer event;
determining if the scheduled timer event is scheduled to trigger within a particular window of time; and
if the scheduled timer event is scheduled to trigger within the particular window of time then servicing the scheduled timer event, otherwise checking for a next task, where each of the plurality of task schedulers is configured for competing with others of the plurality of task schedulers to service timer events on the timer event list prior to competing to process tasks, and is further configured for checking, upon completion of a task by the unique one of the plurality of processors that corresponds to the each of the plurality of schedulers, for a scheduled timer event on the timer event list, where timer events are maintained on the timer event list in a sorted order based on trigger times, and where one of the maintained timer events with a closest of the trigger times is first on the timer event list.

10. The method of claim 9 wherein client software schedules a timer event on the timer event list resulting in the scheduled timer event.

11. The method of claim 9 wherein the scheduled timer event is maintained on the timer event list as a record comprising a trigger time and a call-back address.

12. The method of claim 9 wherein the servicing comprises:
removing the scheduled timer event from the timer event list; and
executing the scheduled timer event.

13. The method of claim 9 wherein the scheduled timer event is a one-time event.

14. The method of claim 9 wherein the scheduled timer event is a periodic timer event.

15. The method of claim 9 wherein the plurality of task schedulers compete to service the scheduled timer event.

16. At least one computer-readable storage device storing computer-executable instructions the, when executed by a computer, cause the computer to perform a method of servicing timer events, the computer comprising a plurality of processors and a plurality of task schedulers that each corresponds to a unique one of the plurality of processors, the method comprising:
completing a current task;
checking a timer event list for a scheduled timer event;
determining if the scheduled timer event is scheduled to trigger within a particular window of time; and
if the scheduled timer event is scheduled to trigger within the particular window of time then servicing the scheduled timer event, otherwise checking for a next task, where each of the plurality of task schedulers is configured for competing with others of the plurality of task schedulers to service timer events on the timer event list prior to competing to process tasks, and is further configured for checking, upon completion of a task by the unique one of the plurality of processors that corresponds to the each of the plurality of schedulers, for a scheduled timer event on the timer event list, where timer events are maintained on the timer event list in a sorted order based on trigger times, and where one of the maintained timer events with a closest of the trigger times is first on the timer event list.

17. The at least one computer-readable storage device of claim 16 wherein the servicing comprises:
removing the scheduled timer event from the timer event list; and
executing the scheduled timer event.

18. The at least one computer-readable storage device of claim 16 wherein the plurality of task schedulers compete to service the scheduled timer event.

* * * * *